(12) United States Patent
Skripko et al.

(10) Patent No.: US 11,550,850 B2
(45) Date of Patent: Jan. 10, 2023

(54) FAST OBJECT LISTING IN GEOGRAPHICALLY DISTRIBUTED DATA STORAGE ENVIRONMENT

(71) Applicant: EMC IP Holding Company LLC, Hopkinton, MA (US)

(72) Inventors: Grigorii Skripko, Seattle, WA (US); Mikhail Danilov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/467,604

(22) Filed: Sep. 7, 2021

(65) Prior Publication Data

US 2021/0397657 A1     Dec. 23, 2021

Related U.S. Application Data

(63) Continuation of application No. 16/424,623, filed on May 29, 2019, now Pat. No. 11,144,598.

(51) Int. Cl.
| | | |
|---|---|---|
| *G06F 16/00* | (2019.01) | |
| *G06F 16/903* | (2019.01) | |
| *G06F 16/909* | (2019.01) | |
| *G06F 16/9035* | (2019.01) | |
| *G06F 16/28* | (2019.01) | |
| *G06F 16/27* | (2019.01) | |

(52) U.S. Cl.
CPC ........ *G06F 16/90335* (2019.01); *G06F 16/27* (2019.01); *G06F 16/289* (2019.01); *G06F 16/909* (2019.01); *G06F 16/9035* (2019.01)

(58) Field of Classification Search
CPC ....................................................... G06F 16/27
See application file for complete search history.

(56) References Cited

U.S. PATENT DOCUMENTS

| | | | |
|---|---|---|---|
| 2008/0046180 A1* | 2/2008 | Zohar | G06F 16/29 701/300 |
| 2014/0278758 A1 | 9/2014 | Christiansen et al. | |

OTHER PUBLICATIONS

Non-Final Office Action received for U.S. Appl. No. 16/424,623 dated Mar. 31, 2021, 12 pages.

* cited by examiner

*Primary Examiner* — Ajith Jacob
(74) *Attorney, Agent, or Firm* — Amin, Turocy & Watson, LLP

(57) ABSTRACT

The described technology is generally directed towards quasi-listing table entries that facilitate the efficient return of an object list in response to a query for relevant objects in a data storage system. A quasi-listing table entry is created when an object is created, and subsequently converted to a normal listing table entry. A normal listing table entry is converted to a quasi-listing table entry when an object is deleted, with the quasi-listing table entry subsequently deleted. When an object list request is received, a normal listing table entry can be used directly to add to the object list; only if a quasi-listing table entry is encountered (before it can be converted or deleted) does the object table need to be accessed to determine if the object actually exists. This eliminates most object table accesses, including those in remote geographic zones, thereby making object listing significantly more efficient.

20 Claims, 11 Drawing Sheets

FAST OBJECT LISTING IN GEOGRAPHICALLY DISTRIBUTED DATA STORAGE ENVIRONMENT

RELATED APPLICATION

The subject patent application is a continuation of, and claims priority to, U.S. patent application Ser. No. 16/424,623, filed May 29, 2019, and entitled "FAST OBJECT LISTING IN GEOGRAPHICALLY DISTRIBUTED DATA STORAGE ENVIRONMENT," the entirety of which application is hereby incorporated by reference herein.

TECHNICAL FIELD

The subject application relates generally to data storage, and, for example, to a technology that facilitates returning a listing of objects, including in a geographically distributed environment, and related embodiments.

BACKGROUND

Contemporary data storage systems, such as Dell EMC®'s ECS (formerly Elastic Cloud Storage) service, store data in a way that ensures data protection while retaining storage efficiency. For additional protection of user data and metadata, ECS supports geographically distributed setups of two or more zones, with the data and metadata distributed and replicated to multiple zones by asynchronous replication. In general, ECS attempts to distribute object metadata and workload between zones evenly, while assuring a global namespace and strong consistency.

The metadata for a given object is maintained in a type of directory table referred to as an object table, with each of the object tables owned by a zone. Because of geographically distributed zones, the metadata for a given object or group of objects may be scattered over directory tables owned by different zones. As a result, when a user requests a listing of a given "bucket" of relevant objects, a query to a potentially remote object table (or object tables) is needed, which can be extremely inefficient and can cause an undesirably slow return of the requested object listing.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
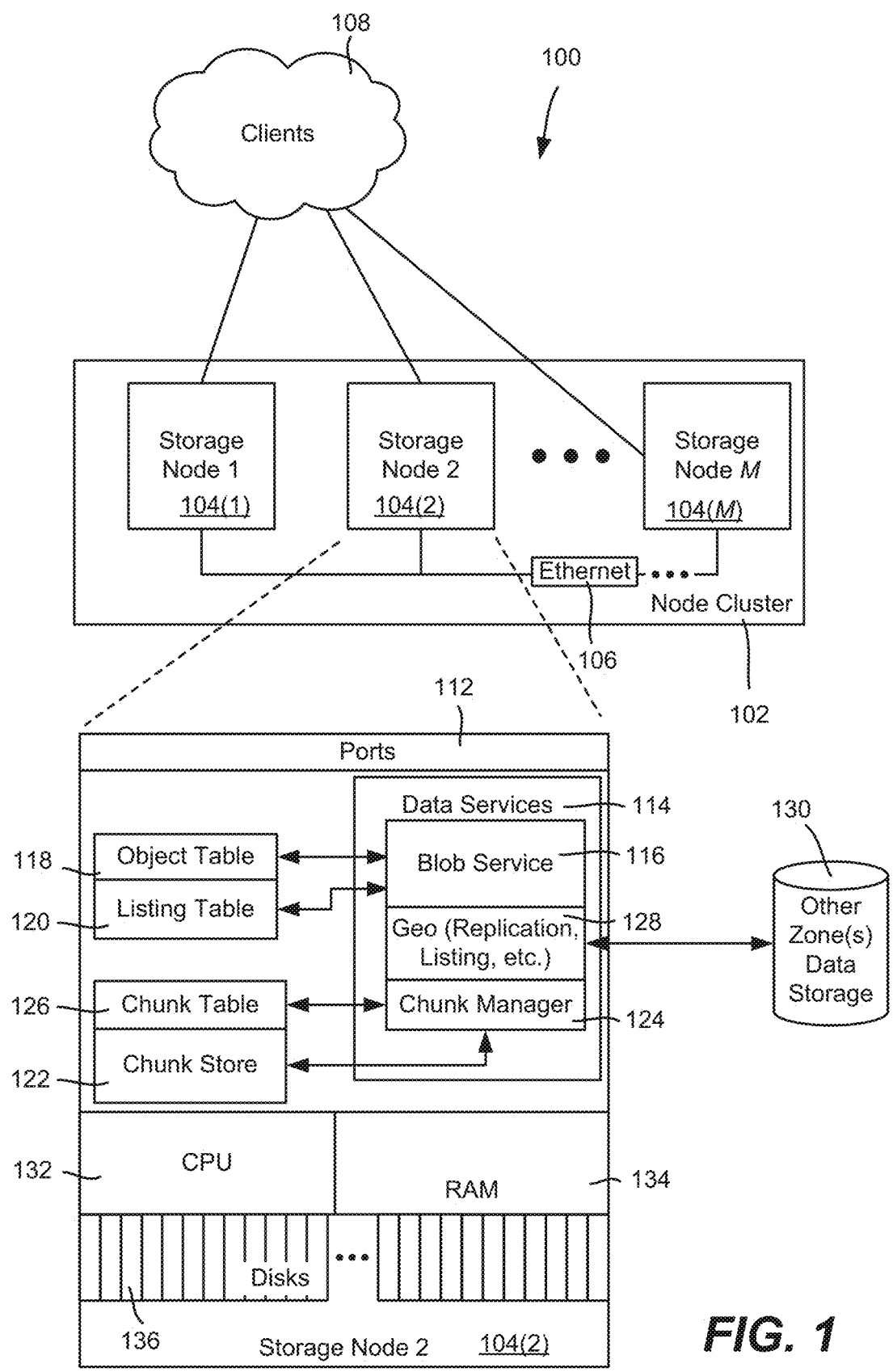
FIG. 1 is an example block diagram representation of part of a data storage system including nodes and geographic zones, in which quasi-listing table entries are used to facilitate object listing, in accordance with various aspects and implementations of the subject disclosure

Various aspects of the technology described herein are generally directed towards using data structures including listing data structures (e.g., tables) and object data structures (e.g., tables) for returning object information in data storage systems, such as Dell EMC® ECS service. In general and as will be understood, the technology uses a listing data structure (a "listing table" in one or more implementations) comprising entries associated with objects' information, wherein a quasi-listing table entry is a listing table entry with an indefinite status. In general, a quasi-listing table entry is created in association with an object upon creation of the object and is intended to be temporary, in that a quasi-listing table entry is typically converted to a normal listing table entry shortly after creation of the object (including creation of an object table entry for the object). Upon deletion of an object, the object's associated normal listing table entry is converted to a quasi-listing table entry, with the quasi-listing table entry intended to be deleted shortly after deletion of the object table entry for that object.

When a query is received for an object listing, the system processes the listing table to obtain information of objects relevant to the query, e.g., those objects that are in a relevant "bucket" of available objects. For a given referenced object, if the listing table has a normal listing table entry, there is no need to query the object table to make sure that referenced object actually exists, because as described herein, a recent deletion of the object would have first converted the normal listing table entry to a quasi-listing table entry. Only if the listing table has a quasi-listing table entry for the referenced object does the object table need to be queried to determine if the object actually exists; (e.g., because of recent creation before conversion to a normal listing table entry) or does not exist (e.g., because of recent deletion before the quasi-listing table entry was able to be deleted). Note that under normal circumstances, the percentage of quasi-listing table entries in the listing table is relatively very small, whereby most of the listing work is performed by the zone that owns the bucket, with very few (and often zero) requests to the object tables maintained in other geographic zones.

In ECS, disk space is partitioned into a set of blocks of fixed size called chunks. The various types of data, including user data and various types of metadata, are stored in chunks. There are different types of chunks, one type per capacity user. In particular, user data is stored in repository chunks, while the metadata is stored in directory tables, where each directory table is a set of key-value search trees. Chunks of each type can be shared. For instance, one repository chunk may contain segments of several user objects, one tree chunk may contain elements of several trees, and so on.

Thus, in ECS, the directory table data structures including the object table and listing table comprise search tree data structures, e.g., B+ Trees search trees, stored in tree chunks. Each tree is owned by one cluster node, and there is a hash function that distributes trees of each directory table between the nodes, which can include distribution among geographic zones; in one or more implementations, each directory table comprises 128 trees.

Each search tree has a journal of updates, with tree journals stored in journal chunks. Trees are maintained in non-volatile memory, and to save on the resource cost of data updates, ECS implements bulk tree updates. More particularly, when an update operation occurs, information about the operation goes into a tree journal as a journal record, also maintained in non-volatile memory.

For efficiency in serving update requests, a node that owns a tree keeps an effective state of the tree (which takes into account the tree's data and updates thereto in the tree's journal) in a memory table in fast, volatile memory. Eventually when space is needed (based on a total combined footprint of a node's memory tables), a node dumps its memory tables into non-volatile storage, with each memory table dumped as a new version of the corresponding tree.

To summarize, ECS implements bulk tree updates in order to minimize the total cost of updates. A node, which owns a tree, keeps an effective state of the tree (which takes into account the tree's journal) in a volatile memory referred to as a memory table. As can be understood, having a considerable part of a search tree in a memory table in fast volatile storage significantly speeds up access to metadata. Memory tables in ECS are relatively large, comprising gigabytes of volatile memory. When the accumulated footprint of all memory tables owned by a node owns exceeds the amount of volatile memory reserved for them, the node dumps the memory tables to a non-volatile memory. Each memory table is dumped as a new version of the corresponding tree. Note that because of the large size of the memory tables, new tree versions are created relatively infrequently.

It should be understood that any of the examples herein are non-limiting. For instance, some of the examples are based on ECS data storage technology; however virtually any storage system may benefit from the technology described herein. As another example, the terms "list" and "listing" and the like are used, but are not meant to limit the technology described herein to any strict definition of a type of data structure; instead, the terms "list" and "listing" and the like refer to any grouping in any suitable data structure, or even multiple data structures. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows part of a data storage system 100 (such as ECS) comprising a node cluster 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system and data services 114; (note however that at least some data service components can be per-cluster, rather than per-node). For example, ECS runs a set of storage services, which together implement storage logic. Services can maintain directory tables for keeping their metadata, which can be implemented as search trees. A blob service 116 maintains an object table 118 (e.g., in various partitions among nodes, including geographically separated zones) that keeps track of objects in the data storage system and generally stores their metadata, including an object's data location information, e.g., within a chunk. The blob service 116 also maintains a listing table 120, although it is alternatively feasible to have such a listing table maintained by another service.

FIG. 1 further represents some additional concepts, in that the user data repository of chunks is maintained in a chunk store 122, managed by another storage service referred to as a chunk manager 124. A chunk table 126 maintains metadata about chunks, e.g., as managed by the chunk manager 124. Note that directory tables and other data can also be maintained in data chunks.

In one or more implementations, the data services 114 can also include geographic-related services (block 128), such as replication and (as described herein) object-listing related querying to remote zone(s)' data storage 130. As is understood, queries related to object listings to a remote zone are relatively inefficient, and are thus avoided to the extent possible via the technology described herein.

In FIG. 1, a CPU 132 and RAM 134 are shown for completeness; note that the RAM 132 may comprise at least some non-volatile RAM. The node 104(2) further includes storage devices such as disks 136, comprising hard disk drives and/or solid-state drives, or any other suitable type of storage resource. As can be readily appreciated, components of the data storage system including those described herein can be at various times in any storage device or devices, such as in the RAM 134, in the disks 136, or in a combination of both, for example.

Figure 2:
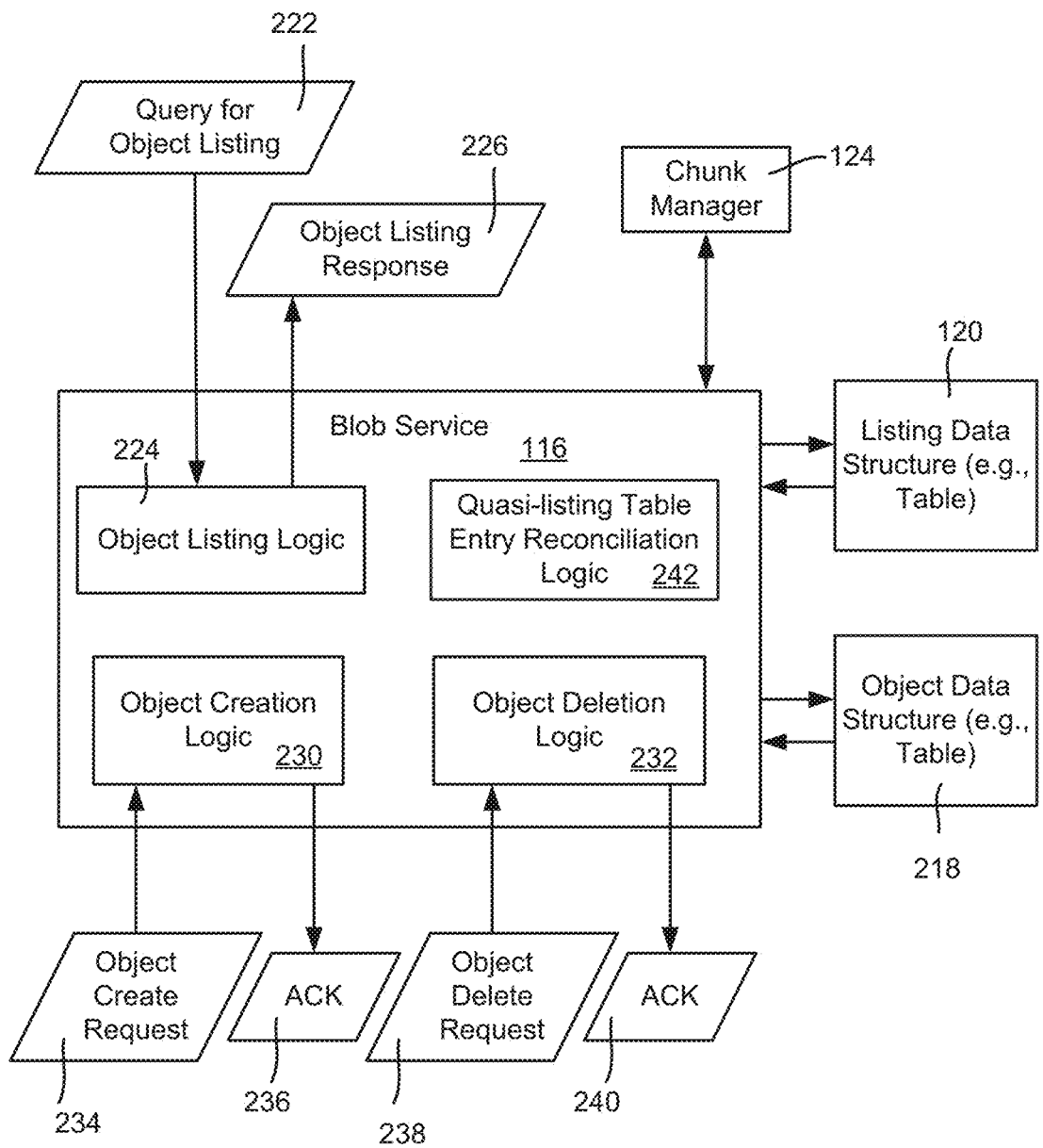
FIG. 2 is an example block diagram/data flow diagram representation related to object listing, object creation and object deletion based on quasi-listing table entries, in accordance with various aspects and implementations of the subject disclosure.

As represented in FIG. 2, in an example implementation a query for an object listing 222 is processed by the blob service 116, e.g., as represented by object listing logic 224. As described herein, the object listing logic 224 accesses the listing table 120 to obtain information about objects relevant to the query 222 to generate a response 226. As also described herein, for any relevant quasi-listing table entries in the listing table 120, the blob service 116 access the object table, which may necessitate going to a remote zone. Note that in FIG. 2 the object table is labeled 218 to represent that the object table 218 can be a combination of remote and local data structures.

Also shown in FIG. 2 is object creation logic 230 and object deletion logic 232. As will be understood, the object creation logic 230, in response to an object create request 234, creates a quasi-listing table entry upon creation of an object, communicates with the chunk manager 124 to store the object's data, and creates an object table entry, sends (if successful) an acknowledgement 236 and thereafter (e.g., asynchronously) converts the quasi-listing table entry to a normal table entry. The object deletion logic 232 deletes an object in response to an object delete request 238, by converting a normal listing table entry to a quasi-listing table entry and deleting the object table entry, and sends (if successful) an acknowledgement 240, and thereafter (e.g., asynchronously) deletes the quasi-listing table entry.

Figure 3:
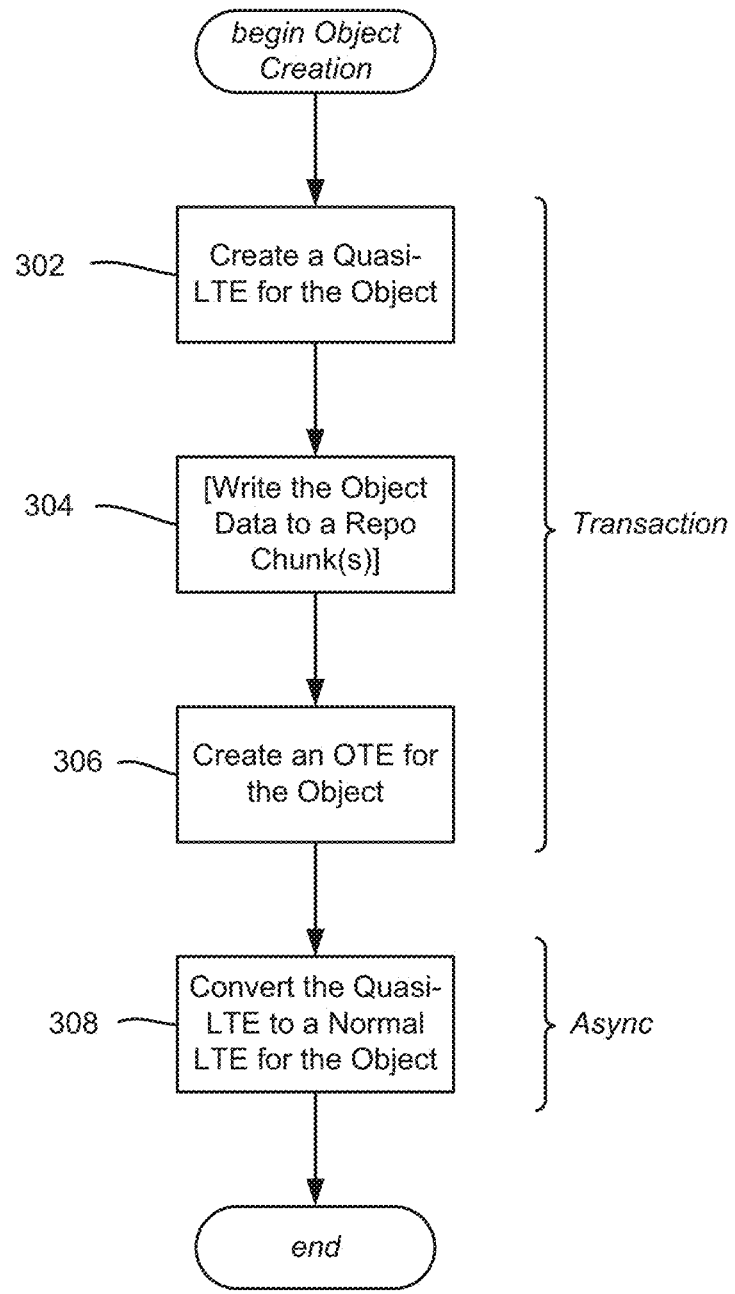
FIG. 3 is an example flow diagram showing example operations related to creating an object in conjunction with quasi-listing table entry-related concepts, in accordance with various aspects and implementations of the subject disclosure.

FIG. 3 summarizes example operations related to creating an object in response to an object creation request 234 (FIG. 2). Operation 302 creates a quasi-listing table entry (LTE) for the object. Operation 304 represents writing the object data to a repository (repo) chunk; note that this can be accomplished via communication with the chunk manager. Operation 306 represents creating an object table entry (OTE) for the object; in general this includes saving the metadata for the object, including the chunk-related information (provided by the chunk manager) needed to access the object data. Note that operations 302, 304 and 306 can be performed in a transaction, with an acknowledgement 236 (FIG. 2, not explicitly reiterated in FIG. 3) sent upon successful completion of the object creation transaction.

Operation 308 represents converting the quasi-listing table entry to a normal listing table entry for the object. Note that in order not to impact performance of the object creation operations, the conversion at operation 308 can be made asynchronous. That is, conversion need not be a part of client transactions, but rather conversion can be performed after an acknowledgment of a successful create transaction is sent to the requesting data client.

Figure 4:
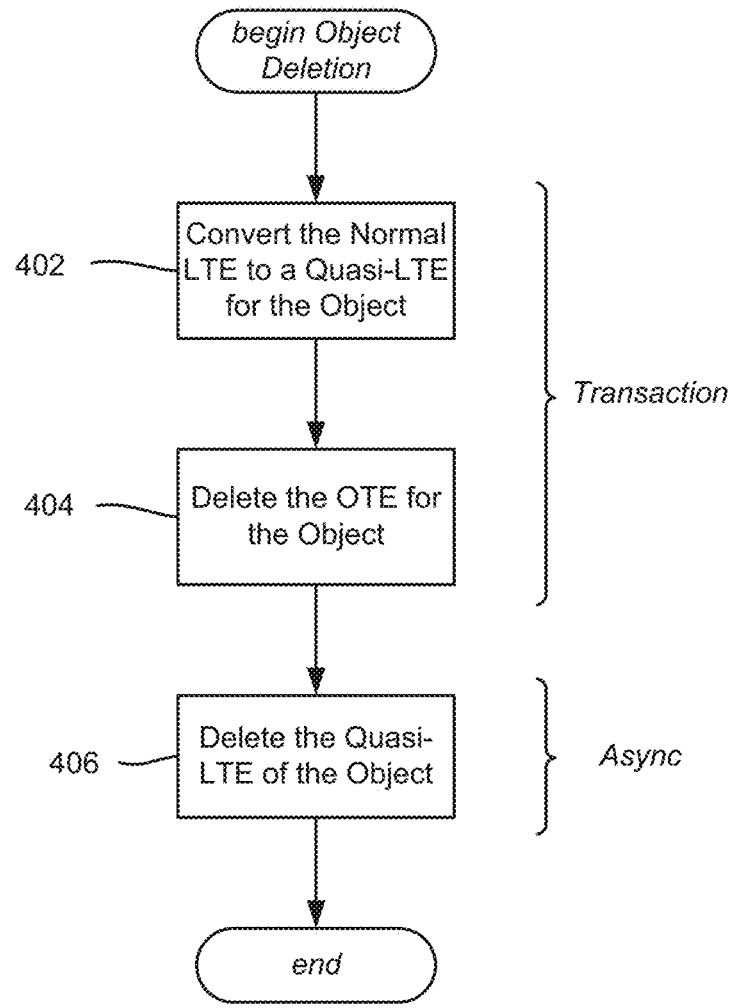
FIG. 4 is an example flow diagram showing example operations related to deleting an object in conjunction with quasi-listing table entry-related concepts, in accordance with various aspects and implementations of the subject disclosure.

FIG. 4 summarizes example operations related to deleting an object in response to an object deletion request 238 (FIG. 2). Operation 402 converts the normal listing table entry of the object to a quasi-listing table entry. Operation 404 represents deleting the object table entry (OTE) for the object; note that the object data in the repository chunk store is garbage collected in one or more implementations; however in alternative implementations it is feasible to delete the object user data as part of this transactional set of operations. Note that operations 402 and 404 can be performed in a transaction, with an acknowledgement 240 (FIG. 2, not explicitly reiterated in FIG. 4) sent upon successful completion of the object deletion transaction.

Operation 406 represents deleting the quasi-listing table entry. Note that in order not to impact performance of the object deletion operations, the deleting at operation 406 can be made asynchronous. That is, deletion need not be a part of client transactions, but rather deletion can be performed after an acknowledgment of a successful delete transaction is sent to the requesting data client.

Thus, from the listing table perspective, object creation and deletion work in two stages, create-and-convert and prepare-and-delete (convert-and-delete), respectively. Notwithstanding, such two-stage approaches do not mean that an impacted listing partition/tree has to be updated twice. For example, as set forth herein, ECS implements bulk tree updates; between tree updates the system keeps an effective state of a tree in a memory table. Under normal circumstances, there is a relatively high probability that both stages of object creation/deletion are executed between two tree updates. In such an event, the two tree modifications (one per stage) are actually compacted into a single tree update.

It should be noted that the subsequent stages of object creation/deletion do not have to be explicit steps of the corresponding transactions, and instead can, for example, be dependent on an implementation of the storage system. For example, a storage service that maintains a listing table may listen for object table updates. In ECS, both the listing table and the object table are maintained by a common storage service, that is, the blob service 116 (FIGS. 1 and 2). The storage service can detect an object table update for a quasi-listing table entry and thereby conclude that an object creation or deletion operation has been completed, and thus decide that it is time to convert or delete the quasi-quasi-listing table entry, respectively.

Returning to FIG. 2, quasi-listing table entry reconciliation logic 242 is illustrated. In general, it is possible that an object creation/deletion transaction fails to complete, resulting in a listing table entry remaining in the state of a quasi-listing table entry. The quasi-listing table entry reconciliation logic 242 detects such entries that are "stuck" in quasi-states, and for each such entry, converts such an entry to a normal listing table entry or deletes the entry, depending on the corresponding existence or non-existence, respectively, of a corresponding object table entry.

More particularly, object creation is driven by a storage node. It is possible that when such a node creates the quasi-listing table entry, the node can crash (due to hardware failure, an out of memory error, etc.) before the node creates the counterpart object table entry. The transaction fails to complete, and thus (as is proper) object creation is not incorrectly acknowledged. However, any such dangling quasi-listing table entries (that is, those without counterpart object table entries) have to be deleted at some time to avoid the number of such dangling quasi-listing table entries growing in the listing table.

The same can occur with object deletion, in which a storage node converts a normal listing table entry to a quasi-listing table entry but crashes before the node deletes the corresponding object table entry. The delete transaction failed to complete and thus (as is proper) object deletion is not incorrectly acknowledged. However, because the quasi-listing table entry has a counterpart object table entry, the quasi-listing table entry needs to be converted back to a normal listing table entry.

Thus, the quasi-listing table entry reconciliation logic 242 represents a self-healing process that detects such quasi-listing table entries, and, depending on a state (non-existence or existence of the respective counterpart entry) in the object table, deletes them or converts them to normal listing table entries. Note that it is feasible for the quasi-listing table entry reconciliation logic 242 to work in conjunction with the object listing logic 224 because the object listing logic 224 detects some quasi-listing table entries.

Figure 5:
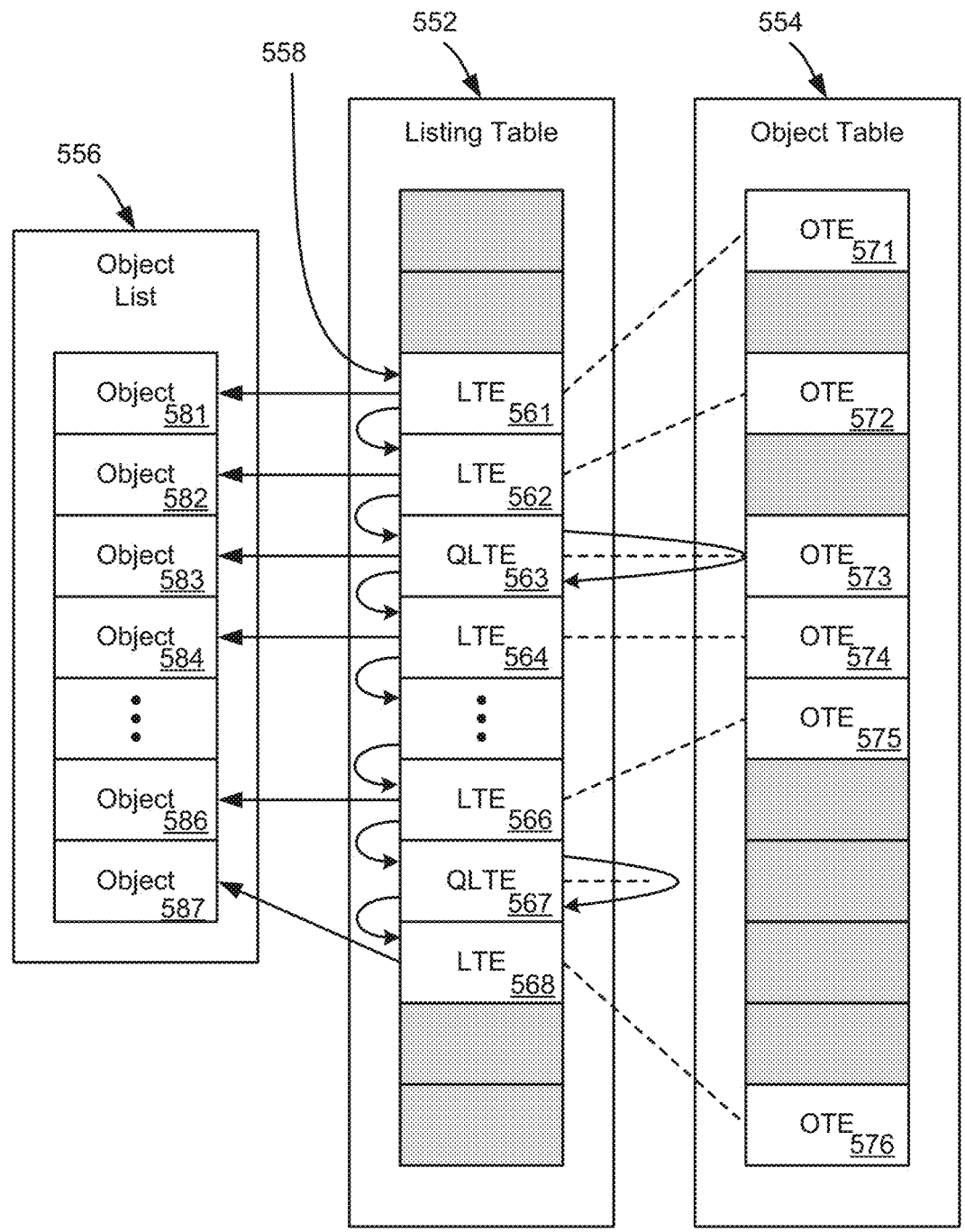
FIG. 5 is an example block diagram/data flow diagram representation of how normal listing table entries and quasi-listing table entries can be used to efficiently generate an object list, in accordance with various aspects and implementations of the subject disclosure.

FIG. 5 illustrates how of the concept of a quasi-listing table entry helps to accelerate object listing. In general, object listing is primarily based on a listing table 552, although an object table 554 can be accessed when needed. When a query for an object listing is received, the query specifies a bucket, with the content of the listing table 552 and the object table 554 used to compose the object list 556 for the requested bucket of relevant objects. In one or more implementations, the listing table 552 is optimized for the listing operation, in that the objects from one bucket are arranged in succession (a key for a listing table entry starts with a bucket identifier).

Because of the create and delete logic above, the technology described herein ensures that normal listing table entries have their counterpart object table entries in the object table 554. As a result, any object referenced by a normal listing table entry can have its information placed directly into the object list. In the example of FIG. 5, the query first (arrow 558) accesses the listing table entry 561; the object listing logic 224 (FIG. 2) evaluates and determines that the listing table entry 561 is a normal listing table entry, and thus writes the object information 581 to the object list 556. Note that the dashed line to the object table 554 indicates the counterpart object table entry 571 for the listing table entry 561, but there is no need to access the object table 554 for this normal listing table entry 561. Similarly, the listing table entry 562 is a normal listing table entry, and thus the object information 582 is put in the object list 556 without needing to access the object table 554.

When the quasi-listing table entry (QLTE) 563 is reached, however, the object table 554 needs to be accessed to determine whether a counterpart object table entry exists, (that is, the corresponding object has been created and not yet deleted). In the example of FIG. 5, it can be seen that via access to the object table (via the curved arrow between the QLTE 563 and OTE 573) the counterpart object table entry 573 exists. Thus, object information 583 is added to the object list 556.

In the example of FIG. 5, after some normal listing table entries are reached resulting in additions to the object list 556, the object listing logic reaches the quasi-listing table entry (QLTE) 567. There is no counterpart object table entry for this quasi-listing table entry 567, and thus no corresponding object information is added to the object list for this object, which has been deleted or failed to create properly.

Thus, it is seen that a query to the object table is performed only quasi-listing table entries. When a counterpart of a quasi-listing table entry is found in the object table, the object referenced by the quasi-listing table entry goes to the object list. Otherwise, the system jumps to a next listing table entry (until the listing operation ends, as described below).

Figure 6:
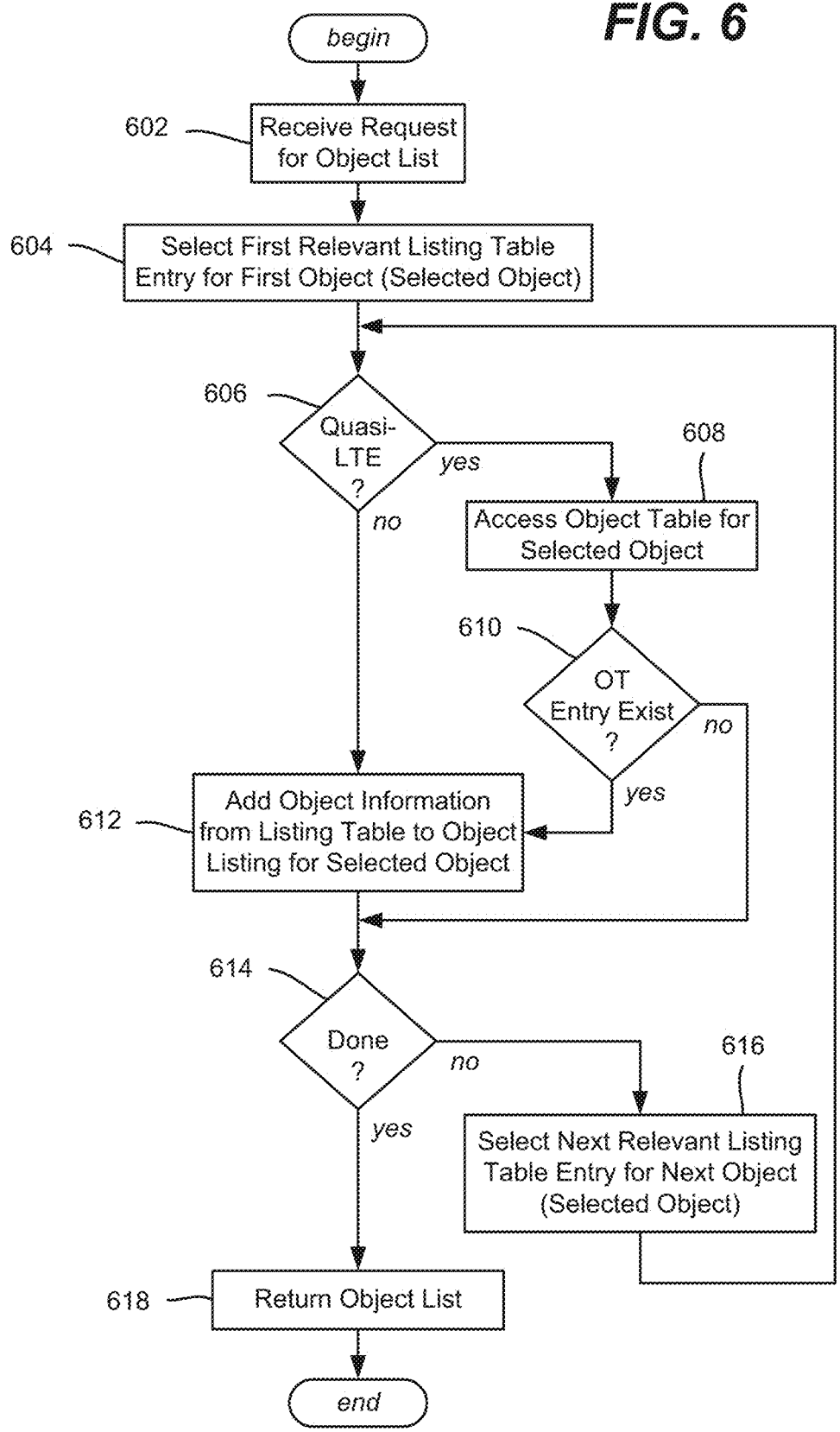
FIG. 6 is an example flow diagram showing example operations related to generating an object list when normal listing table entries and quasi-listing table entries can be present in a listing table, in accordance with various aspects and implementations of the subject disclosure.

FIG. 6 summarizes the object listing logic, beginning at operation 602 which represents receiving the request for an object list, e.g., with the request indicating the bucket. Operation 604 locates and selects the first listing table entry for a relevant object of the bucket.

Operation 606 evaluates whether the listing table entry is a quasi-listing table entry. If not, (that is, the listing table entry is a normal listing table entry), the process advances to operation 612 to add the object information from the listing table to the object listing for the selected object. If a quasi-listing table entry, operation 608 accesses the object table for the selected object, and, if as evaluated at operation 610 the object table entry exists, the process branches to operation 612 to add the object information from the listing table to the object listing for the selected object. Otherwise, the object does not actually exist, and operation 612 is skipped.

Operations 614 and 616 repeat the process for other objects in the bucket that have their entries in the listing table. Operation 618 returns the object list in response to the request. Note that the object list need not be returned in a single response, and for example, a large list can be returned in a series of subset responses as objects for the list become identified.

With respect to ending the object list, note that a query is normally time-based; for example a query can request the objects that were created within a given time frame specified by [start time, end time]. Thus, when entries in a listing table are ordered by creation time, the query finishes when a next listing table has a creation time that is greater that the specified end time. When an end time is not set, the query is requesting "objects created as of now" such that the query finishes when another listing table entry describes an object that belongs to some other bucket that is not a subject of the query. Either of these criteria, as well as other possible criterion can be evaluated at operation 614 to end the query processing.

As seen in FIGS. 5 and 6, when the system selects another listing table entry, the logic checks the type of the entry. For a normal listing table entry there is no need to query the object table to make certain the referenced object is really there; instead an object table query is only needed for a necessary for quasi-listing table entry. As indicated above, under normal circumstances the ratio of quasi-listing table entries to normal listing table entries in the listing table is very small. Therefore, most of the listing work is performed by one zone, namely the zone that owns the bucket, with very few (or no) requests to other zones. This provides for a very high throughput of an object listing without significantly increasing system workload.

It should be noted that when operation 606 detects a quasi-listing table entry, an additional group of operations can be performed to help eliminate dangling quasi-listing table entries, that is, those detected in conjunction with generating the object list. For example, if at operation 610 the object table entry exists for a quasi-listing table entry, in addition to adding the object information to the object list at operation 612, the process can also convert the quasi-listing table entry to a normal listing table entry. If instead the "no" branch is taken at operation 610, the process can delete the quasi-listing table entry. It is also feasible to mark such entries at this time for subsequent conversion or deletion by a separate process, such as to make the quasi-listing table entry reconciliation logic 242 more efficient with respect to locating "good" versus dangling quasi-listing table entries.

Figure 7:
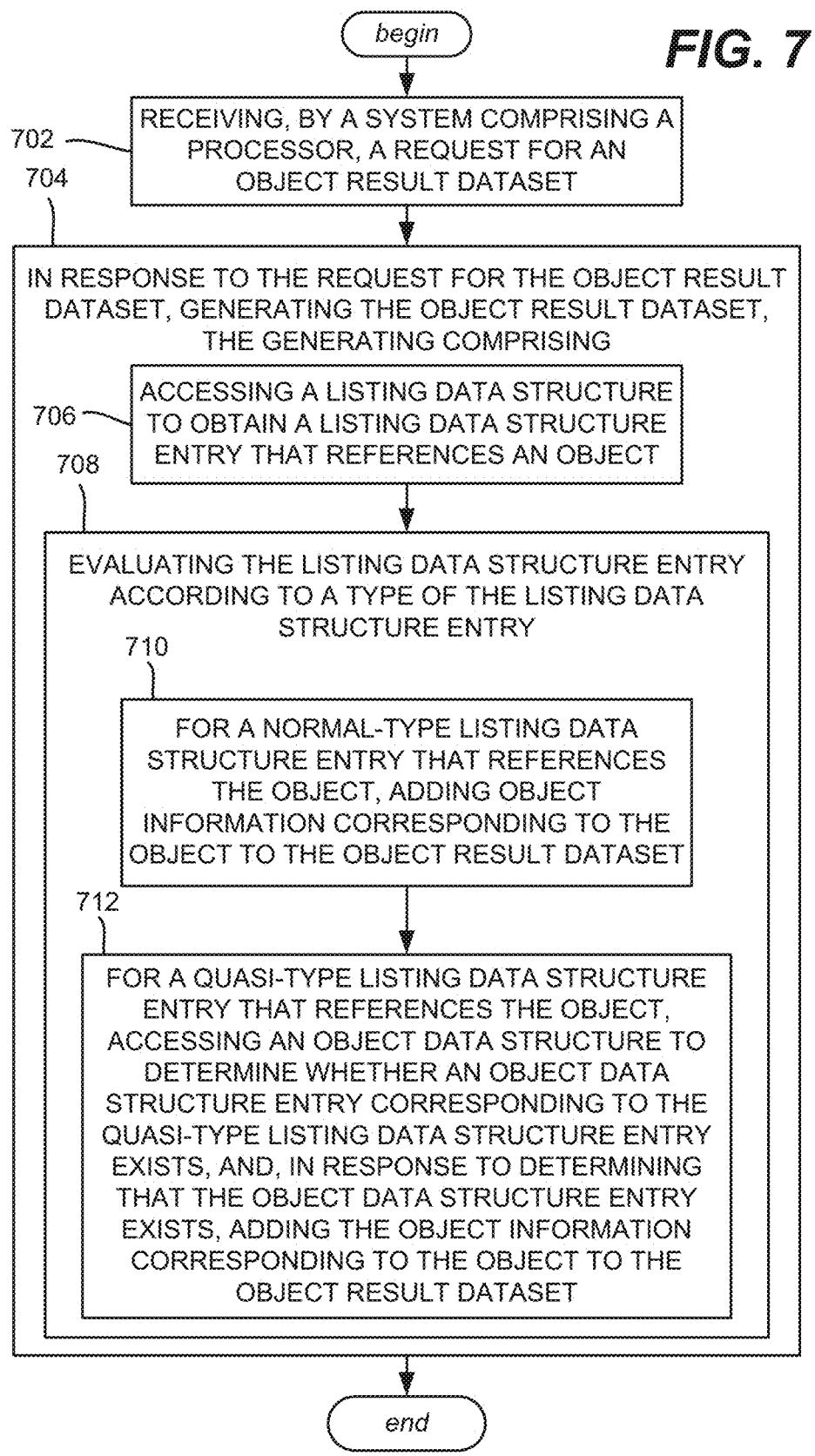
FIG. 7 is an example flow diagram showing example operations related to using normal listing table entries and quasi-listing table entries to generate an object list, in accordance with various aspects and implementations of the subject disclosure.

One or more example aspects, such as corresponding to operations of a method, are represented in FIG. 7. Operation 702 represents receiving, by a system comprising a processor, a request for an object result dataset. Operation 704 represents, in response to the request for the object result dataset, generating the object result dataset. The generating can comprise operation 706, which represents accessing a listing data structure to obtain a listing data structure entry that references an object, and operation 708, which represents evaluating the listing data structure entry according to a type of the listing data structure entry. Operation 710 represents, for a normal-type listing data structure entry that references the object, adding object information corresponding to the object to the object result dataset. Operation 712 represents, for a quasi-type listing data structure entry that references the object, accessing an object data structure to determine whether an object data structure entry corresponding to the quasi-type listing data structure entry exists, and, in response to determining that the object data structure entry exists, adding the object information corresponding to the object to the object result dataset.

The quasi-type listing data structure entry can be a first quasi-type listing data structure entry and the object can be a first object; aspects can comprise receiving an object creation request to create a second object, and, in response to the receiving the object creation request, maintaining the listing data structure, comprising adding a second quasi-type listing data structure entry that references the second object to the listing data structure, writing object data associated with the second object to an object data store, and maintaining the object data structure, comprising adding an object data structure entry that references the second object to the object data structure.

The normal-type listing data structure entry can be a first normal-type listing data structure entry; aspects can comprise converting the quasi-type listing data structure entry that references the second object to a second normal-type listing data structure entry that references the second object.

Aspects can comprise asynchronously converting the second quasi-type listing data structure entry that references the second object to the second normal-type listing data structure entry that references the second object.

The normal-type listing data structure entry can be a first normal-type listing data structure entry, the quasi-type listing data structure entry can be a first quasi-type listing data structure entry, and the object can be a first object; aspects can comprise receiving an object deletion request to delete a second object, and, in response to the receiving the object deletion request, maintaining the listing data structure, comprising converting a second normal-type listing data structure entry that references the second object to a second quasi-type listing data structure entry, and maintaining the object data structure, comprising deleting an object data structure entry that references the second object from the object data structure.

Aspects can comprise asynchronously deleting the second quasi-type listing data structure entry that references the second object from the listing data structure.

Generating the object result dataset can comprise processing at least one other listing entry in the listing table until a stopping criterion is met. Processing the at least one other listing entry in the listing table until the stopping criterion is met can comprise stopping upon detecting a listing table entry that references another object that is not a subject of the request. Processing the at least one other listing entry in the listing table until the stopping criterion is met can comprise stopping upon detecting an end of a time range associated with the request.

Figure 8:
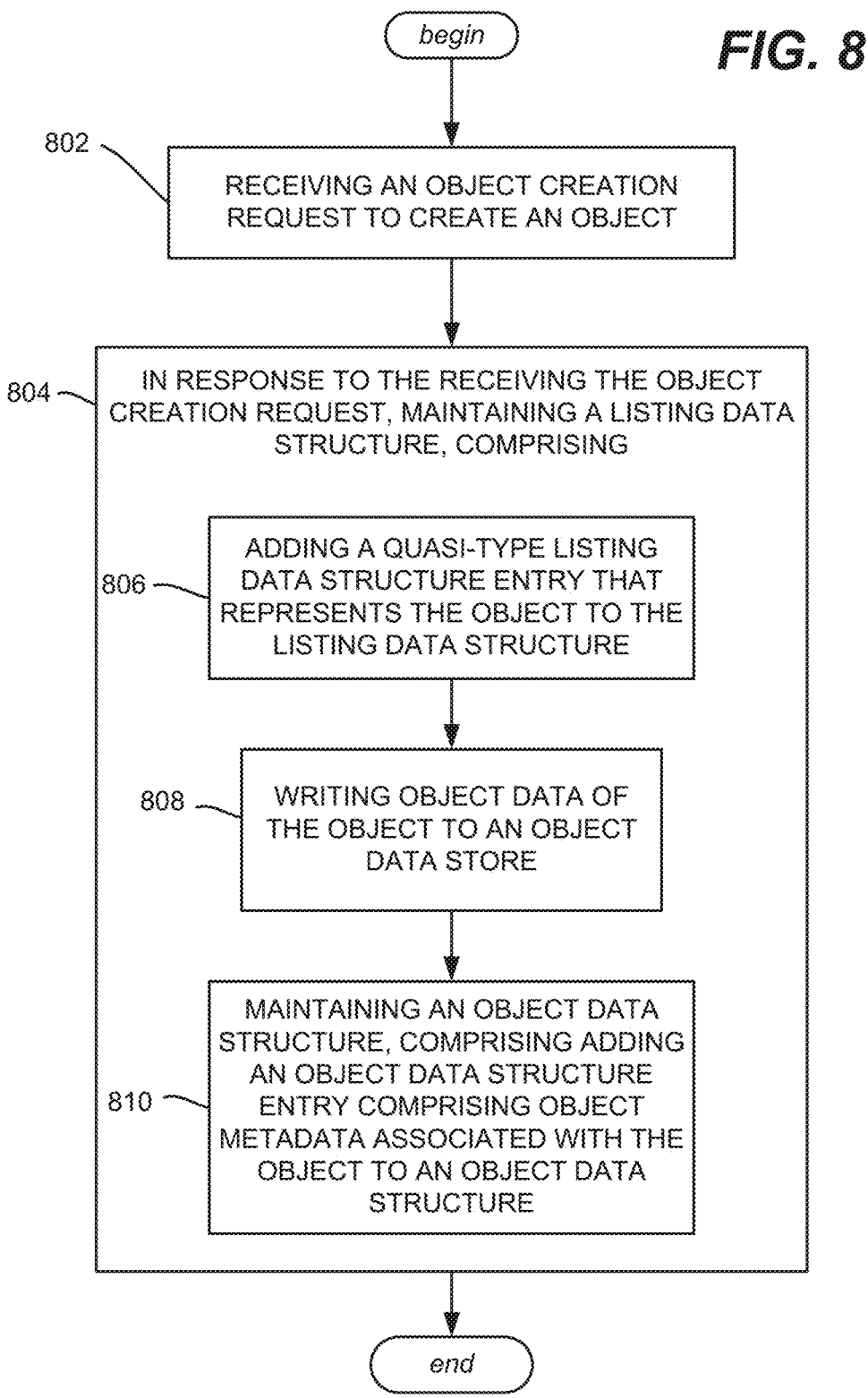
FIG. 8 is an example flow diagram showing example operations related to creating an object in conjunction with a quasi-listing table entry and maintaining an object data structure (e.g., object table), in accordance with various aspects and implementations of the subject disclosure.

One or more aspects can be embodied in a system, such as represented in FIG. 8, and for example can comprise a memory that stores computer executable components and/or operations, and a processor that executes computer executable components and/or operations stored in the memory. Example operations can comprise operation 802, which represents receiving an object creation request to create an object, and operation 804, which represents, in response to the receiving the object creation request, maintaining a listing data structure. This can comprise operation 806, which represents adding a quasi-type listing data structure entry that represents the object to the listing data structure, operation 808, which represents writing object data of the object to an object data store, and operation 810, which represents maintaining an object data structure, comprising adding an object data structure entry comprising object metadata associated with the object to an object data structure.

Further operations can comprise receiving a request for an object result dataset, and in response to the request for the object result dataset, generating the object result dataset, which can comprise accessing the listing data structure to obtain a listing data structure entry that references the object, and evaluating the listing data structure entry, which can comprise for a normal-type listing data structure entry that references the object, adding object information corresponding to the object to the object list, and, for a quasi-type listing data structure entry that references the object, accessing the object data structure to determine whether an object data structure entry corresponding to the quasi-type listing data structure entry exists, and in response to determining that the object data structure entry exists, adding the object information corresponding to the object to the object result dataset.

The adding the quasi-type listing data structure entry that represents the object to the listing data structure, the writing the object data of the object to the object data store, and the maintaining the object data structure, which can comprise adding the object data structure entry comprising the object metadata associated with the object to the object data structure, can occur in a transaction; further operations can comprise converting, external to the transaction, the quasi-type listing data structure entry to a normal-type listing data structure entry.

Further operations can comprise receiving an object deletion request to delete the object, and in response to the receiving the object deletion request, maintaining the listing data structure, which can comprise, in a transaction, converting the normal-type listing data structure entry to a quasi-type listing data structure entry in the listing data structure, and deleting the object data structure entry from the object data structure.

Further operations can comprise accessing the listing data structure to obtain the quasi-type listing data structure entry, determining whether the quasi-type listing data structure entry has a corresponding object listing data structure entry, and in response to the determining that the quasi-type listing data structure entry does not have a corresponding object listing data structure entry, removing the quasi-type listing data structure entry from the listing data structure, and, in response to the determining that the quasi-type listing data structure entry does have a corresponding object listing data structure entry, converting the quasi-type listing data structure entry to the normal-type listing data structure entry in the listing data structure.

Figure 9:
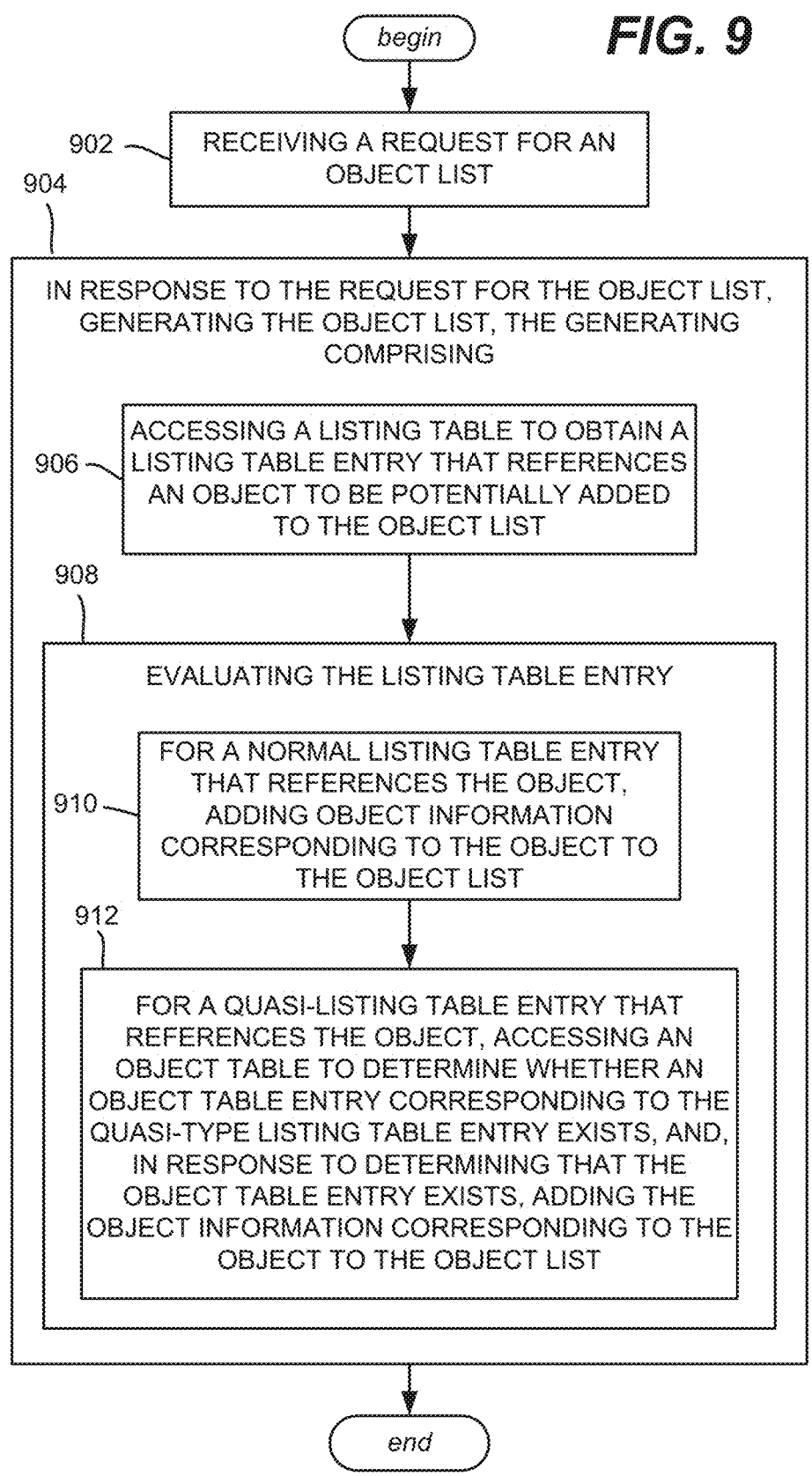
FIG. 9 is an example flow diagram showing example operations related to using normal listing table entries and quasi-listing table entries to generate an object list, in accordance with various aspects and implementations of the subject disclosure.

FIG. 9 summarizes various example operations, e.g., corresponding to executable instructions of a machine-readable storage medium, in which the executable instructions, when executed by a processor, facilitate performance of the example operations. Operation 902 represents receiving a request for an object list. Operation 904 represents, in response to the request for the object list, generating the object list. The generating can comprise operation 906, which represents accessing a listing table to obtain a listing table entry that references an object to be potentially added to the object list. Operation 908 represents evaluating the listing table entry, and for a normal listing table entry that references the object, adding object information corresponding to the object to the object list (operation 910), and/or for a quasi-listing table entry that references the object, accessing an object table to determine whether an object table entry corresponding to the quasi-type listing table entry exists, and, in response to determining that the object table entry exists, adding the object information corresponding to the object to the object list (operation 912).

Further operations can comprise receiving an object creation request to create a second object, and in response to the receiving the object creation request, maintaining the listing table; the maintaining can comprise adding a quasi-listing table entry that references the second object to the listing table, writing object data associated with the second object to an object data store, and maintaining the object table, comprising adding an object table entry that comprises metadata of the second object to the object table.

The normal listing table entry can be a first normal listing table entry; further operations can comprise converting the quasi-listing table entry that references the second object to a second normal listing table entry that references the second object.

The normal listing table entry can be a first normal listing table entry, the quasi-listing table entry can be a first quasi-listing table entry, and the operations can further comprise receiving an object deletion request to delete the second object, and, in response to the receiving the object deletion request, maintaining the listing table, comprising converting a second normal listing table entry that references the second object to a second quasi-listing table entry, and maintaining the object table, comprising deleting an object table entry that references the second object from the object table.

Further operations can comprise asynchronously deleting the second quasi-type listing table entry that references the second object from the listing table.

Further operations can comprise accessing the listing table to obtain the quasi-listing table entry, determining whether the quasi-listing table entry has a corresponding object listing table entry, and, in response to the determining that the quasi-listing table entry does not have a corresponding object listing table entry, removing the quasi-listing table entry from the listing table, and, in response to the determining that the quasi-listing table entry does have a corresponding object listing table entry, converting the quasi-listing table entry to a normal-listing table entry in the listing table.

As can be seen, described herein is an efficient technology, based on the concept of a quasi-listing table entry, for object listing in a geographic zone environment that assures a very fast object listing. The technology does not significantly impact performance of object create/delete operations and does not significantly increase system workload.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
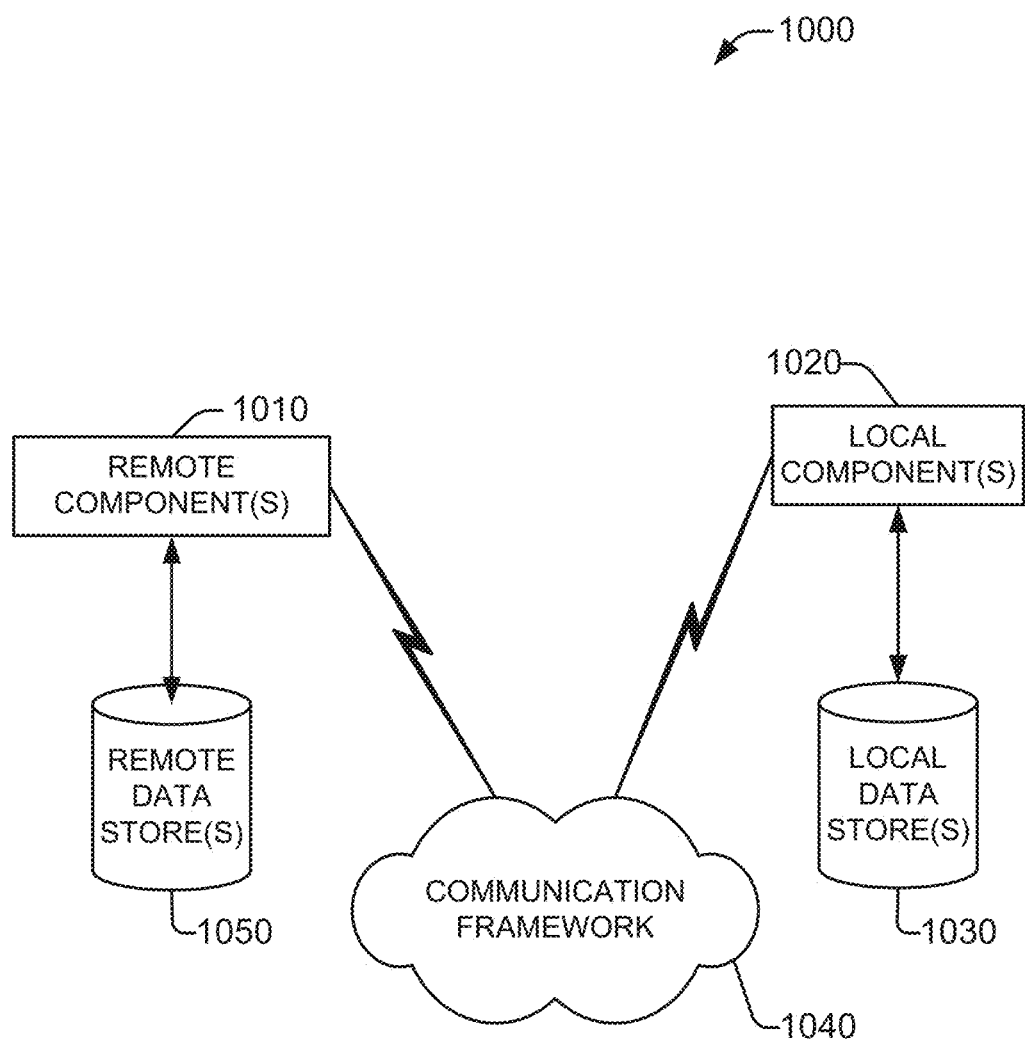
FIG. 10 is a block diagram representing an example computing environment into which aspects of the subject matter described herein may be incorporated.

FIG. 10 thus illustrates a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
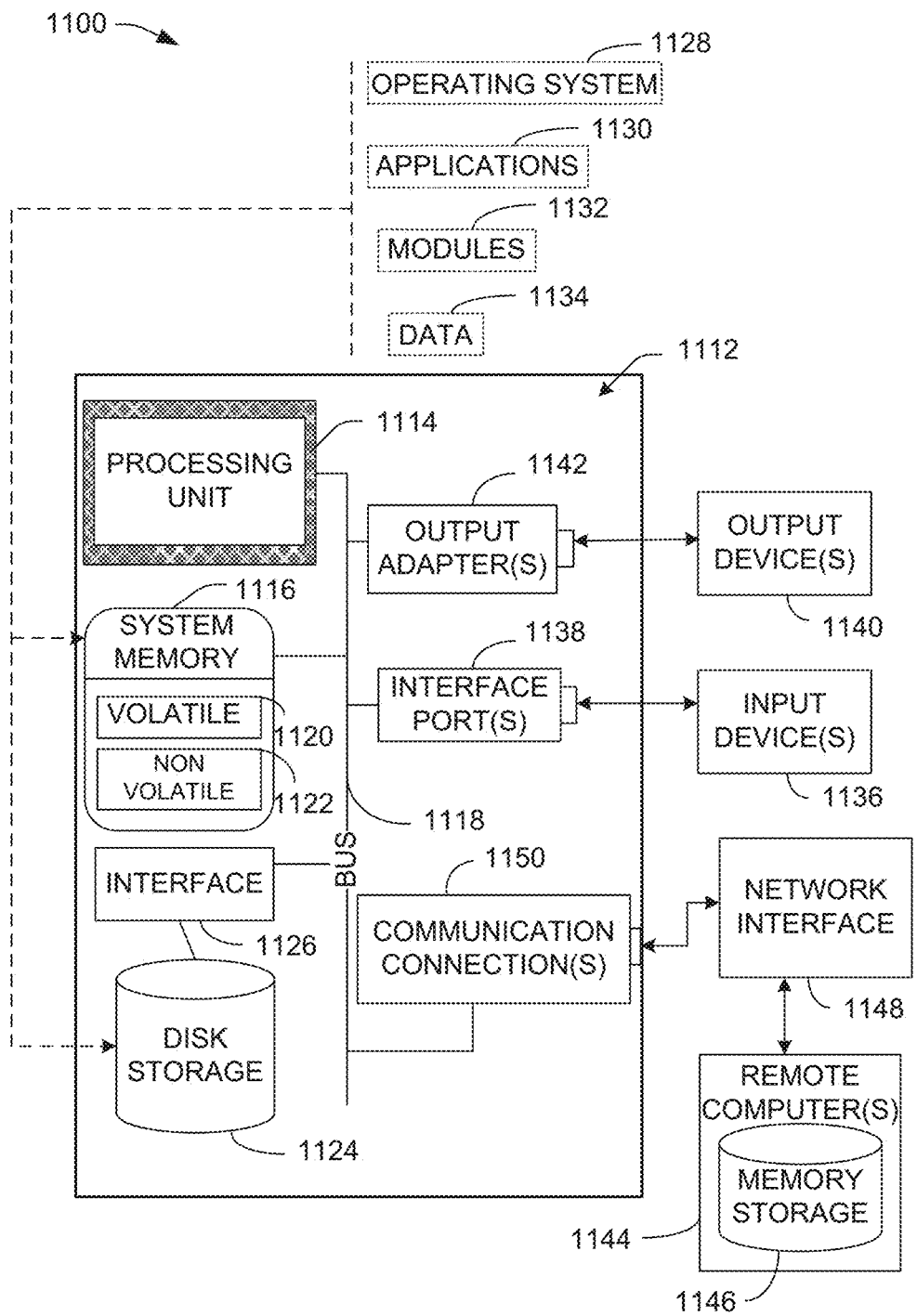
FIG. 11 depicts an example schematic block diagram of a computing environment with which the disclosed subject matter can interact, in accordance with various aspects and implementations of the subject disclosure.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with one or more embodiments/implementations described herein. Computer 1112 can comprise a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial busport can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   receiving, by a system comprising a processor, an object creation request to create a first object;
   in response to the receiving the object creation request, maintaining, by the system, a listing data structure, comprising:
      adding a first quasi-type listing data structure entry that represents the first object in the listing data structure,
      writing first object data of the first object to an object data store, and
      maintaining an object data structure, comprising adding a first object data structure entry comprising object metadata associated with the first object in the object data structure;
   receiving, by the system, another object creation request, other than the object creation request, to create a second object; and
   in response to the receiving the other object creation request, maintaining, by the system, the listing data structure, comprising adding a second quasi-type listing data structure entry that references the second object to the listing data structure, writing second object data associated with the second object to the object data store, and maintaining the object data structure, comprising adding a second object data structure entry that references the second object to the object data structure.

2. The method of claim 1, further comprising:
   receiving, by the system, a request for an object result dataset;
   in response to the request for the object result dataset, generating, by the system, the object result dataset, the generating comprising, accessing the listing data structure to obtain a listing data structure entry that references an object; and evaluating, by the system, the listing data structure entry, comprising:

for the listing data structure entry being a normal-type listing data structure entry that references the object, adding object information corresponding to the object to the object result dataset, and, for the listing data structure entry being a quasi-type listing data structure entry that references the object:

accessing the object data structure to determine whether an object data structure entry corresponding to the quasi-type listing data structure entry exists, and in response to determining that the object data structure entry exists, adding the object information corresponding to the object to the object result dataset.

3. The method of claim 1, wherein the adding the first quasi-type listing data structure entry that represents the first object in the listing data structure, the writing the first object data of the first object to the object data store, and the maintaining the object data structure, comprising adding the first object data structure entry comprising the first object metadata associated with the first object in the object data structure occur in a transaction; and further comprising converting, by the system external to the transaction, the first quasi-type listing data structure entry to a normal-type listing data structure entry.

4. The method of claim 3, further comprising:

receiving, by the system, an object deletion request to delete the first object; and in response to the receiving the object deletion request, maintaining, by the system, the listing data structure, comprising, in another transaction other than the transaction:

converting the normal-type listing data structure entry to the first quasi-type listing data structure entry in the listing data structure, and deleting the first object data structure entry from the object data structure.

5. The method of claim 4, further comprising:

accessing, by the system, the listing data structure to obtain the first quasi-type listing data structure entry;

determining, by the system, whether the first quasi-type listing data structure entry has a corresponding object listing data structure entry;

in response to the determining that the first quasi-type listing data structure entry does not have the corresponding object listing data structure entry, removing, by the system, the quasi-type listing data structure entry from the listing data structure; and in response to the determining that the first quasi-type listing data structure entry does have the corresponding object listing data structure entry, converting, by the system, the first quasi-type listing data structure entry to the normal-type listing data structure entry in the listing data structure.

6. The method of claim 1, further comprising converting, by the system, the second quasi-type listing data structure entry that references the second object to a normal-type listing data structure entry that references the second object.

7. A system, comprising:

a processor; and a memory that stores executable instructions that, when executed by the processor, facilitate performance of operations, the operations comprising:

receiving an object creation request to create a first object; and in response to the receiving the object creation request, maintaining a listing data structure, comprising:

adding, to the listing data structure, a first quasi-type listing data structure entry that represents the first object, writing first object data of the first object to an object data store, and maintaining an object data structure, comprising adding, to the object data structure, a first object data structure entry comprising first object metadata associated with the first object;

receiving another object creation request, other than the object creation request, to create a second object; and in response to the receiving the other object creation request, maintaining the listing data structure, comprising adding a second quasi-type listing data structure entry that references the second object to the listing data structure, writing second object data associated with the second object to the object data store, and maintaining the object data structure, comprising adding a second object data structure entry that references the second object to the object data structure.

8. The system of claim 7, wherein the operations further comprise, receiving a request for an object result dataset;

in response to the request for the object result dataset, generating the object result dataset, the generating comprising, accessing the listing data structure to obtain a listing data structure entry that references n object; and evaluating the listing data structure entry, comprising:

for the listing data structure entry being a normal-type listing data structure entry that references the object, adding object information corresponding to the object to the object result dataset, and, for the listing data structure entry being a quasi-type listing data structure entry that references the object:

accessing the object data structure to determine whether an object data structure entry corresponding to the quasi-type listing data structure entry exists, and in response to determining that the object data structure entry exists, adding, to the object result dataset, the object information corresponding to the object.

9. The system of claim 7, wherein the adding the first quasi-type listing data structure entry that represents the first object in the listing data structure, the writing the first object data of the first object to the object data store, and the maintaining the object data structure, comprising adding the first object data structure entry comprising the first object metadata associated with the first object in the object data structure occur in a transaction; and the operations further comprising converting, external to the transaction, the first quasi-type listing data structure entry to a normal-type listing data structure entry.

10. The system of claim 9, wherein the operations further comprise:
receiving an object deletion request to delete the first object; and
in response to the receiving the object deletion request, maintaining the listing data structure, comprising, in another transaction:
converting the normal-type listing data structure entry to the first quasi-type listing data structure entry in the listing data structure, and
deleting the first object data structure entry from the object data structure.

11. The system of claim 10, wherein the operations further comprise:
accessing the listing data structure to obtain the first quasi-type listing data structure entry;
determining whether the first quasi-type listing data structure entry has a corresponding object listing data structure entry;
in response to the determining that the first quasi-type listing data structure entry does not have the corresponding object listing data structure entry, removing the quasi-type listing data structure entry from the listing data structure; and
in response to the determining that the first quasi-type listing data structure entry has the corresponding object listing data structure entry, converting the first quasi-type listing data structure entry to the normal-type listing data structure entry in the listing data structure.

12. The system of claim 7, wherein the operations further comprise converting the second quasi-type listing data structure entry that references the second object to a normal-type listing data structure entry that references the second object.

13. A non-transitory machine-readable medium, comprising executable instructions that, when executed by a processor, facilitate performance of operations, the operations comprising:
receiving an object creation request to create a first object; and
in response to the receiving the object creation request, maintaining a listing data structure, comprising:
adding a first quasi-type listing data structure entry that represents the first object to the listing data structure,
writing first object data of the first object to an object data store, and
maintaining an object data structure, comprising adding a first object data structure entry comprising first object metadata associated with the first object to the object data structure;
receiving another object creation request, other than the object creation request, to create a second object; and
in response to the receiving the other object creation request, maintaining the listing data structure, comprising adding a second quasi-type listing data structure entry that references the second object to the listing data structure, writing second object data associated with the second object to the object data store, and maintaining the object data structure, comprising adding a second object data structure entry that references the second object to the object data structure.

14. The non-transitory machine-readable medium of claim 13, wherein the operations further comprise,
receiving a request for an object result dataset;
in response to the request for the object result dataset, generating the object result dataset, the generating comprising, accessing the listing data structure to obtain a listing data structure entry that references n object; and
evaluating the listing data structure entry, comprising:
for a normal-type listing data structure entry that references the object, adding object information corresponding to the object to the object result dataset, and,
for a quasi-type listing data structure entry that references the object:
accessing the object data structure to determine whether an object data structure entry corresponding to the quasi-type listing data structure entry exists, and
in response to determining that the object data structure entry exists, adding the object information corresponding to the object to the object result dataset.

15. The non-transitory machine-readable medium of claim 13, wherein the adding the first quasi-type listing data structure entry that represents the first object in the listing data structure, the writing the first object data of the first object to the object data store, and the maintaining the object data structure, comprising adding the first object data structure entry comprising the first object metadata associated with the first object in the object data structure occur in a transaction; and
the operations further comprising converting, external to the transaction, the first quasi-type listing data structure entry to a normal-type listing data structure entry.

16. The non-transitory machine-readable medium of claim 15, wherein the operations further comprise:
receiving an object deletion request to delete the first object; and
in response to the receiving the object deletion request, maintaining the listing data structure, comprising, in another transaction:
converting the normal-type listing data structure entry to the first quasi-type listing data structure entry in the listing data structure, and
deleting the first object data structure entry from the object data structure.

17. The non-transitory machine-readable medium of claim 16, wherein the operations further comprise:
accessing the listing data structure to obtain the first quasi-type listing data structure entry;
determining whether the first quasi-type listing data structure entry has a corresponding object listing data structure entry;
in response to the determining that the first quasi-type listing data structure entry does not have the corresponding object listing data structure entry, removing the quasi-type listing data structure entry from the listing data structure; and
in response to the determining that the first quasi-type listing data structure entry does have the corresponding object listing data structure entry, converting the first quasi-type listing data structure entry to the normal-type listing data structure entry in the listing data structure.

18. The non-transitory machine-readable medium of claim 13, wherein the operations further comprise:
converting the second quasi-type listing data structure entry that references the second object to a normal-type listing data structure entry that references the second object.

19. The non-transitory machine-readable medium of claim 13, wherein the first quasi-type listing data structure entry indicates an indefinite status with respect to whether the first object exists in the object data store.

20. The non-transitory machine-readable medium of claim 13, wherein the second quasi-type listing data structure entry indicates an indefinite status with respect to whether the second object exists in the object data store.

* * * * *